United States Patent [19]

Hönig et al.

[11] 4,174,332
[45] Nov. 13, 1979

[54] SELF-CROSSLINKING RESIN EMULSIONS FOR CATHODICALLY DEPOSITABLE COATING COMPOSITIONS

[75] Inventors: Helmut Hönig; Georgios Pampouchidis, both of Graz, Austria

[73] Assignee: Vianova Kunstharz, A.G., Vienna, Austria

[21] Appl. No.: 874,565

[22] Filed: Feb. 2, 1978

[30] Foreign Application Priority Data

Feb. 7, 1977 [AT] Austria .................................. 758/77
Dec. 15, 1977 [AT] Austria ................................ 8955/77

[51] Int. Cl.$^2$ ............................................. C08L 63/00
[52] U.S. Cl. ..................... 260/29.2 TN; 260/29.2 EP; 260/29.6 NR
[58] Field of Search ............... 260/29.2 TN, 29.6 NR, 260/29.2 EP

[56] References Cited

U.S. PATENT DOCUMENTS 3,799,854  3/1974  Jerabek ......................... 260/29.2 TN
3,804,786  4/1974  Sekmakas ..................... 260/29.2 TN Primary Examiner—Maurice J. Welsh
Attorney, Agent, or Firm—A. W. Breiner

[57] ABSTRACT

Aqueous emulsions of binders for cathodically depositable aqueous coating compositions comprising emulsions of (A) 98 to 50 percent by weight of at least one water-soluble self-crosslinking cationic resin which is water-dilutable upon partial or total neutralization with an inorganic or organic acid and having at least 0.5 basic nitrogen atoms in 1000 molecular weight units and a double bond number of at least 0.5; and (B) 2 to 50 percent by weight of a water-insoluble self-crosslinking polycondensation resin or polymerization resin having a double bond number of at least 0.8. Optionally, the water-insoluble self-crosslinking resin can include basic character but insufficient to provide water solubility. The emulsions have excellent stability without use of other emulsifiers even in substantially diluted form usual for electrodeposition baths. The emulsions when used in coating compositions provide films which have good adhesion characteristics, cure at relatively low temperatures and relatively short curing times to provide films having excellent resistance to water, chemicals, and corrosion.

9 Claims, No Drawings

SELF-CROSSLINKING RESIN EMULSIONS FOR CATHODICALLY DEPOSITABLE COATING COMPOSITIONS

The present invention is directed to binders for protective coatings which are depositable by electrodeposition. More particularly, it is directed to aqueous emulsions of cathodically depositable binders which are self-crosslinking and to a process for producing such emulsions.

Electrodeposition of synthetic resins and plastics, although known for substantial time, has gained technical importance as a coating process in only recent years. The coating compositions or binders which are presently used for commercial electrodeposition are primarily those containing polycarboxylic acid resins neutralized with bases. The products deposit at the anode of an electrodeposition system. Owing to the acidic character of the resins, the products are sensitive to corroding influences exerted by salts and particularly by alkalis. Furthermore, coatings of the aforesaid compositions tend to undergo spot discoloration or undergo other chemical change as a result of the metal ions anodically dissolved from the anode. Accordingly, there has been a desire to use coating compositions which will deposit at the cathode of an electrodeposition system.

A substantial number of binders are disclosed in the literature carrying groupings neutralizable with acids which can be deposited on cathodically wired objects of an electrodeposition system. Many have disadvantages primarily due to the need to have crosslinking additives in the coating compositions which adversely affect film characteristics. Recently, however, coating compositions have been provided which are self-crosslinking through thermal polymerization. These self-crosslinking binders include binders comprising—

(A) the reaction products of diepoxy compounds with alpha, beta-unsaturated acids and, optionally, long chain fatty acids, and basic monoisocyanates as described in copending application Ser. No. 816,936 filed July 19, 1977, assigned to the assignee of the present application;

(B) reaction products of diepoxy compounds, which optionally include fatty acids, with monoamines and unsaturated monoisocyanates as described in copending application Ser. No. 816,937 filed July 19, 1977, assigned to the assignee of the present application; and (C) two moles of a diepoxy compound plus one mole of a primary-tertiary or secondary-secondary diamine plus two moles of an alpha, beta-unsaturated monocarboxylic acid and, optionally, an unsaturated fatty acid, plus an unsaturated monoisocyanate as described in copending application Ser. No. 849,265 filed Nov. 7, 1977, assigned to the assignee of the present application.

The aforesaid binders are highly desirable due to their ability to self-crosslink through the presence of alpha, beta-unsaturation; their being water-soluble in the presence of acids due to the basic nitrogen atoms, and their ability to provide excellent films with good performance characteristics, particularly regarding resistance to corroding influences. However, such products at times exhibit poor leveling of the deposited films on certain substrates as well as providing inadequate adhesion, particularly to untreated steel.

OBJECTS OF THE INVENTION AND GENERAL DESCRIPTION

Surprisingly it has now been found that the poor leveling and inadequate adhesion as above noted are overcome, enabling the preparation of cathodically depositable binders for electrodeposition which excel in application characteristics as well as with respect to the quality of the deposited and crosslinked coatings over products known in the art up to now by emulsifying the aforesaid self-crosslinking binders with water-insoluble polymerizable resins. The emulsions obtained exhibit excellent stability without the use of other emulsifiers, even when in substantially diluted form as is usual for electrodeposition baths. The water-insoluble resins influence the viscosity curve as well as the curing characteristics of the deposited films, thereby substantially guaranteeing the formation of high quality film surfaces as well as leading to a considerable improvement in adhesion and leveling of the deposited films to diverse substrates including steel. The superior adhesion characteristics further enhance corrosion resistance. Furthermore, the addition of the water-insoluble resin permits regulation of the deposition equivalent, in turn influencing the build-up of the film. Finally, the addition of the polymerizable resins enhances the crosslinking density of the binders which in turn improves the corrosion resistance.

According to the present invention, (A) 98–50% by weight, preferably 95 to 60% by weight of a water-soluble self-crosslinking cationic resin which is water dilutable upon partial or total neutralization with inorganic and/or organic acids, carrying at least 0.5, preferably 0.8 to 1.5, basic nitrogen atoms in 1000 molecular weight units, and with a double bond number of at least 0.5, preferably 0.8 to 2.5, and (B) 2–50% by weight, preferably 5 to 40% by weight of a water-insoluble self-crosslinking polycondensation resin or polymerization resin including a polyaddition resin with a double bond number of at least 0.8, preferably 1 to 4, are emulsified in water, optionally after mixing or milling together with pigments, extenders, and known additives, and upon partial or total neutralization of the basic groupings of the system with inorganic or organic acids. "Double bond number" as used herein is the number of chain end and side chain double bonds in 1000 molecular weight units.

The water-soluble self-crosslinking cationic resins suitable for use in the emulsions of the present invention are the self-crosslinking binders for cathodic deposition carrying unsaturated groups as well as basic nitrogen groups described in the hereinbefore noted copending applications. The binders of the copending applications are highly desirable due to their ability to self-crosslink through the presence of alpha,beta-unsaturation; their being water-soluble in the presence of acids due to the basic nitrogen atoms, and their ability to provide excellent films with good performance characteristics, particularly regarding resistance to corroding influences. However, other binders including the polycondensation resins such as polyesters or aminoaldehyde condensation products; polymerization products such as copolymers of acrylic monomers and, optionally, other monomers; maleic acid addition products to diene-homo or copolymers, and polyaddition products obtained by modification of epoxy compounds with opening of the oxirane ring can also be emulsified with the water-insoluble resins.

In addition to the process as described above, the process of the present invention can be modified to the extent that the water-insoluble self-crosslinking resins used as component (B) includes basic nitrogen groups. Through this measure it is possible to achieve a degree of corrosion resistance using a lower stoving temperature, i.e., a temperature of from 150° to 170° C., in contrast to a stoving temperature of from 170° to 190° C. The lower stoving temperature is of paramount importance with commercial applications since, on the one hand, it is very difficult to guarantee that all parts of the objects, e.g., of a car body, fully attain the higher stoving temperatures and, accordingly, that the films are fully cured. On the other hand, when an object such as a car body is at a temperature of about 200° C. or above, defects of the car body can be expected to arise. Lower temperatures also permit savings in energy. It is essential for a realization of the aforesaid modification that the basic nitrogen containing water-insoluble resin (component "C" in Table 1 hereinafter), although containing the nitrogen groupings, is practically insoluble in water even on 50 percent neutralization of the nitrogen group with acids. This means that with the neutralization conditions prevailing in practice with electrodeposition, component C is present substantially in emulsified form. The quantity of basic nitrogen atoms present in this component may range from 0.3 to 1.7. It is theorized that the reduction of stoving temperature obtainable thereby is due to a catalyzing action of the thermal polymerization of the nitrogen grouping also present in the water-insoluble component.

Table 1 gives an exemplary list of the preferred resins for use in the present invention, setting forth their composition. The essential criteria for the self-crosslinking component (component A) used according to the invention are the basicity represented by the presence of at least 0.5, preferably 0.8 to 1.5, basic nitrogen atoms in 1000 molecular weight units and a double bond number of at least 0.5, preferably 0.8 to 2.5, of chain end or side chain double bonds. The essential characteristics for the water-insoluble resins (component B of the Table) are the presence of a sufficient number of chain end or side chain double bonds as expressed by a double bond number of at least 0.8, preferably 1 to 4. The essential characteristics for component C are the presence of an adequate double bond number as in component B and some basic nitrogen groups, but insufficient for water-solubility.

Table 1

| Resin Component | Starting Material | | Modifiers (moles) | | | | | | |
|---|---|---|---|---|---|---|---|---|---|
| | Quantity | Type | FA | MCA | DAA | ACOH | ACG | BMI | UMI |
| A | 1 Mole | Diepoxide | 0-1 | 2-1 | — | — | — | 1-2 | — |
| A | 1 mole | Diepoxide | 0-1 | — | 2-1 | — | — | — | 1-2 |
| A | 1000 g | COP | — | 2 | — | — | — | 1-2 | — |
| A | 2 moles | Diepoxide | 0-2 | 2-0 | — | — | — | — | 0-2 |
| | 1 mole | PTD/SSD | | | | | | | |
| A | 1000 g | Polyester | — | — | — | — | — | 1-2 | 1-2 |
| A | 1000 g | PD-A | — | — | 2 | 2 | 2 | — | — |
| B | 1 mole | Diepoxide | 0-1 | 2-1 | — | — | — | — | — |
| B | 1000 g | Polyester | — | — | — | — | — | — | 1-4 |
| B | 1000 g | PD-A | — | — | — | 2 | 2 | — | — |
| B | 1 mole | HMMM | — | — | — | 3 | — | — | — |
| B | 1000 g | COP | — | 2 | — | — | — | — | — |
| C | 1 mole | Diepoxide | 0-1 | — | 1-2 | — | — | — | 2-3 |
| C | 1 Mole | Triepoxide | 0-1 | — | 2-3 | — | — | — | 2-4 |
| C | 1000 g | COP | — | — | 1-2 | — | — | — | 2-3 |
| C | 1000 g | polyester | — | — | — | — | — | 1 | 2-3 |

Key to Table 1
Resin Component A -self-crosslinking basic products
Resin Component B -self-crosslinking products without basic character
Resin Component C -self-crosslinking products with weak basic character (water-insoluble with 50% neutralization)
FA -saturated or unsaturated fatty acids
MCA -alpha,beta-unsaturated monocarboxylic acid
DAA -sec. dialkyl or dialkanolamine
ACOH -hydroxy(meth)acrylate
ACG -glycidyl(meth)acrylate
PTD/SSD -primary/tertiary or secondary/secondary diamine
BMI -basic monoisocyanate (prepared, e.g., from a diisocyanate and alkanolamine)
UMI -unsaturated monoisocyanate (prepared,e.g., from a diisocyanate and hydroxyacrylate)
Polyester -hydroxy group containing polyester or an alkyd resin with a hydroxyl number of at least 150 mg KOH/g
PD-A -maleic anhydride addition product to diene polymers, e.g., polybutadiene, -pentadiene or copolymers of such dienes (maleic acid equivalent about 500)
-hexamethoxymethylmelamine
COP -acrylic copolymer with a level of glycidyl(meth)acrylate to provide an epoxy equivalent of about 500

The emulsions of the invention are advantageously prepared whereby first the two components, optionally with heating, are mixed homogeneously. Blending or milling with pigments, extenders, and additives can be effected simultaneously. Then the neutralizing agent is admixed with stirring and the batch is diluted with water to the desired concentration. The concentration in water of the binder depends upon the parameters of electrodeposition and may lie in a range of between about 3 to 30% by weight and preferably from about 5 to 15% by weight.

In a preferred procedure equal or chemically similar starting materials are used for the two components. Through this method, difficulties likely to occur on film formation owing to poor compatibility of the components can be avoided. In many cases, e.g., when using reaction products of aldehyde amine condensates with hydroxyacrylates as the emulsified component, a different type emulsifying component will bring optimum results.

The basic groups of the cationic component of the binders of the invention are partially or totally neutralized with organic and/or inorganic acids such as formic acid, acetic acid, lactic acid, phosphoric acid, etc., and are then diluted with water. The degree of neutralization depends upon the characteristics of the individual binder. The preferred binder composition permits dilution or dispersion with water at a pH-value of from 4 to 9, preferably 5 to 8.

Upon electrodeposition, the binder of the invention as a vehicle of the aqueous coating composition is wired to a conductive anode and cathode, the surface of the cathode being coated with the coating composition. The conductive substrates to be coated may be of a variety of materials, particularly of metals such as steel, aluminum, copper, etc. However, metalized materials rendered conductive through a conductive coating can be used. After deposition, the coating is cured at a stoving schedule of from about 130° to 200° C., preferably 150° to 180° C. for about 5 to 30 minutes, preferably 10 to 25 minutes.

The following examples illustrate the invention. It is to be understood, however, that the preferred examples are non-limiting in their scope. Explanation of the abbreviations used in the examples is as follows:

DBz—double bond number (number of chain end and side chain double bonds in 1000 molecular weight units)
BNz—number of basic groupings in 1000 molecular weight units
BMI (70%)—70% solution in AEGLAC of a basic monoisocyanate, prepared from 1 mole TDI and 1 mole dimethylethanolamine
UMI-1(70%)—70% solution in AEGLAC of an unsaturated monoisocyanate prepared from 1 mole TDI and 1 mole hydroxyethylmethacrylate
UMI-2(70%)—70% solution in AEGLAC of an unsaturated monoisocyanate prepared from 1 mole of TDI and 1 mole hydroxyethylacrylate
AEGLAC—ethylglycolacetate (monoethyleneglycolmonoethyletheracetate)
MIBK—methylisobutylketone
TDI—toluylenediisocyanate (A) Preparation of the self-crosslinking products with basic characteristics. (Component A)

(A1) In a reaction vessel equipped with stirrer, addition funnel for dropwise addition and thermometer, 1000 g of a Bisphenol A based epoxy resin having an epoxy equivalent of about 500 in 492 g AEGLAC are dissolved at 60° to 70° C. 0.2 g hydroquinone and 144 g of acrylic acid are added and the temperature is raised to 100° to 110° C. At the stated temperature the reaction is carried to an acid value of below 5 mg KOH/g (DBz=1.75). Then, at 60° to 70° C., the reaction product is mixed with 652 g BMI (70%) and reacted to an NCO-value of substantially 0 (DBz=1.25, BNz=1.1).

(A2) 520 g of a Bisphenol A based epoxy resin having an epoxy equivalent of about 260 are dissolved in 465 g AEGLAC and reacted according to the procedure of (A1) with 564 g of a semiester of tetrahydrophthalic anhydride and hydroxyethylmethacrylate (DBz=1.85). The reaction product is further reacted with 750 g of BMI (70%) as in (A1) (DBz=1.24, BNz=1.24).

(A3) 1000 g of an epoxy resin (epoxy equivalent about 500) is reacted as in (A1) with 86.5 g acrylic acid and 224 g dehydrated castor oil fatty acid and, subsequently, with 652 g BMI (70%) (DBz=0.68, BNz=0.99).

(A4) To a solution of 1000 g of a Bisphenol A based epoxy resin having an epoxy equivalent of about 500 in 520 g AEGLAC, 210 g of diethanol amine are added dropwise within an hour at a temperature of about 100° to 110° C. The batch is thereafter heated to 150° C. and reacted for another hour. Subsequently, the reaction product is reacted at 60° to 70° C. with 652 g UMI-1(70%) to an NCO-value of practically 0 (DBz-0.90, BNz=1.20).

(A5) A copolymer is prepared in known manner from 180 g acrylic acid, 120 g ethylacrylate, 250 g methylmethacrylate, 250 g n-butylacrylate, 250 g styrol, 695 g AEGLAC, in the presence of 20 g azodiisobutyronitrile and tert.dodecylmercaptan, at 100° to 105° C. Upon addition of hydroquinone, the copolymer is reacted with 355 g glycidyl methacrylate to an acid value of below 5 mg KOH/g (DBz-1.85). The reaction product is then reacted at 60° to 70° C. with 564 g BMI(70%) to an NCO-value of practically 0 (DBz=1.40, BNz=0.84).

(A6) 740 g of a diepoxy compound based on Bisphenol A having an epoxy equivalent of about 185 are reacted at 100° to 170° C. with 102 g 3-dimethylaminopropylamine and 560 g dehydrated castor oil fatty acid, and diluted with 600 g AEGLAC. The reaction product is then reacted at 60° to 70° C. with 866 g UMI-1(70%) to an NCO-value of practically 0 (DBz=0.99, BNz=0.99).

(A7) 485 g dimethylterephthalate and 555 g neopentylglycol are reacted at 160° to 200° C. until the theoretical quantity of methanol is distilled off. After addition of 645 g adipic acid the batch is reacted at 160° to 190° C. to an acid value of 131 mg KOH/g and the polyester is further reacted with 401 g of tris-hydroxymethylaminomethane to an acid value of below 1 mg KOH/g. The reaction product, diluted to 70% with AEGLAC, has a hydroxyl number of 224 mg KOH/g. 1430 g of the 70% solution are reacted to an NCO-value of practically 0, at 60° to 70° C., with 564 g BMI (70%) and 652 g UMI-1(70%) (DBz=0.81, BNz=0.81).

(A8) 1000 g of a polybutadiene-maleic anhydride adduct having an MA-equivalent of about 500 are dissolved in 705 g MIBK and reacted with 260 g hydroxyethylmethacrylate at 90° to 105° C. in the presence of 0.2 g hydroquinone and, subsequently with 284 g glycidylmethacrylate to an acid value of below 10 mg KOH/g (DBz=2.6). Thereafter, 109.5 g diethylamine are added to the reaction product and completely reacted at 50° to 80° C. (DBz=1.51, BNz=0.91). The polybutadiene employed is a liquid polybutadiene with 60 to 70% being of cis-configuration.

(B) Preparation of self-crosslinking products without basic characteristics. (Component B)

(B1) Analogous to (A1) 1000 g of an epoxy resin based on Bisphenol A having an epoxy equivalent of about 500 are dissolved in 492 g AEGLAC and, upon addition of 0.2 g hydroquinone, are reacted with 144 g acrylic acid, at 100° to 110° C., until an acid value of below 5 mg KOH/g is reached (DBz=1.75).

(B2) 520 g of an epoxy resin based on Bisphenol A having an epoxy equivalent of about 260 are dissolved in 465 g AEGLAC and reacted as in (B1) with 564 g of a semiester of tetrahydrophthalic anhydride and hydroxyethylmethacrylate (DBz=1.85).

(B3) 360 g of an epoxy resin based on Bisphenol A having an epoxy equivalent of from 175 to 182 are reacted at 100° to 110° C. in the presence of 0.2 g hydroquinone with 144 g acrylic acid to an acid value of below 3 mg KOH/g and diluted with AEGLAC to 80 percent (DBz=3.97).

(B4) 1000 g of a styrol-maleic anhydride copolymer having an MA-equivalent of from about 330 to 335 are dissolved in 775 g MIBK and, in the presence of 0.2 g hydroquinone, are reacted at 90° to 120° C. with 390 g hydroxy ethylmethacrylate and 425 g of glycidylmethacrylate to an acid value of below 10 mg KOH/g (DBz=3.3).

(B5) A copolymer is prepared in known manner from 180 g acrylic acid, 120 g ethyl acrylate, 250 g methylacrylate, 250 g n-butylacrylate and 250 g styrol, in 695 g AEGLAC, in the presence of 20 g each of azobisisobutyronitrile and tertiary dodecylmercaptan. The product is further reacted with 355 g of glycidyl methacrylate at 105° to 110° C., with the addition of 0.2 g hydroquinone to an acid value of below 5 mg KOH/g (DBz=1.85).

(B6) 390 g hexamethoxymethylmelamine and 390 g hydroxyethylmethacrylate are reacted at 80° to 100° C. in the presence of 0.8 g hydroquinone and 0.6 g p-toluolsulfonic acid until the theoretical quantity of methanol calculated according to the re-etherification reaction has distilled off. The product is diluted with MIBK to a solids content of 80 percent (DBz=3.85).

(B7) 1430 g of the 70% solution of the hydroxy groups containing polyester of (A7) are reacted with 1300 g UMI-1(70%) at from about 60° to 70° C. until an NCO-value of practically 0 is attained (DBz=1.57).

(B8) 1000 g of a polybutadiene-maleic anhydride adduct as in (A8) having an MA-equivalent of about 500 are dissolved in 705 g MIBK and reacted at 90° to 105° C. in the presence of 0.2 g hydroquinone with 260 g hydroxyethylacrylate, and thereafter with 284 g glycidylmethacrylate until an acid value of below 10 mg KOH/g is reacted (DBz-2.6).

(C) Preparation of self-crosslinking products with weak basic character. (Component C)

(C1) In a reaction vessel, equipped with stirrer, thermometer, addition funnel and reflux condensor, 400 g of an epoxy resin based on Bisphenol A (epoxy equivalent of about 200) is dissolved in 172 g AEGLAC at 60° to 70° C. At 90° to 120° C. during one hour 210 g of diethanolamine are added dropwise. Then, the temperature is raised to 150° C. and held for one hour. At 60° to 70° C., 830 g UMI-2 (70%) are added and reacted to an NCO-value of substantially 0 (DBz=1.68, BNz=1.68).

(C2) As in (C1) above, 500 g of an epoxy resin based on Bisphenol A (epoxy equivalent about 250) is dissolved in 215 g AEGLAC. 210 g of diethanol amine are thereafter reacted. The reaction product is then reacted with 995 g of UMI-2 (70%) (DBz=1.71, BNz-1.42).

(C3) 1000 g of an epoxy resin based on Bisphenol A (epoxy equivalent about 500) is dissolved in 520 g of AEGLAC and thereafter reacted with 210 g diethanol amine as in (C1) above before further reaction with 1245 g UMI-2 (70%) (DBz-1.4, BNz-0.965).

(C4) 600 g of an epoxy novolak (epoxy equivalent about 200; epoxy functionality=3) is dissolved in 400 g AEGLAC and then reacted as in (C1) first with 210 g diethanolamine, thereafter with 280 g dehydrated castor oil fatty acid, and then the reaction product is reacted with 434 g UMI-1 (70%) and 830 g UMI-2 (70%) (DBz-1.53, BNz=1.02).

(C5) A copolymer is prepared in known manner from 215 g ethylacrylate, 200 g styrol, 300 g n-butylacrylate, and 285 g glycidylmethacrylate in 670 g AEGLAC in the presence of 20 g each of azodiisobutyronitrile and tert.dodecylmercaptan. At 120° to 150° C. the copolymer is reacted with 210 g diethanolamine. The reaction product is reacted at 60° to 70° C. with 1240 g UMI-2 (70%) to an NCO-value of substantially 0 (DBz-1.43, BNz-0.94).

(C6) 485 g dimethylterephthalate and 555 g neopentylglycol are reacted at 160° to 200° C. until the theoretical quantity of methanol has distilled off. Upon addition of 645 g of adipic acid, esterification at 160° to 190° C. is carried on until an acid value of 131 mg KOH/g results. The polyester is then reacted with 401 g trishydmethyl-roxyaminomethane to an acid value of less than 1 mg KOH/g. The reaction product, diluted to 70 percent with AEGLAC, has a hydroxyl number of 224 mg KOH/g. 1430 g of the 70 percent solution is then reacted at 60° to 70° C. with 376 g BMI (70%) and 1240 g UMI-2 (70%) to an NCO-value of substantially 0 (DBz=1.41, BNz-0.47).

EXAMPLES 1-37

100 parts resin solids of a cationic self-crosslinking resin (A) are thoroughly mixed, optionally with heating up to 70° C., with the following quantities on resin solids of the self-crosslinking water-insoluble resin (B) or (C). The weight ratios are listed in Table 2.

TABLE 2

| Example No. | Resin A 100 parts solids each | Resin B parts resin solids | |
|---|---|---|---|
| 1 | A 1 | 20 | B 1 |
| 2 | A 1 | 10 | B 3 |
| 3 | A 1 | 30 | B 5 |
| 4 | A 1 | 25 | B 6 |
| 5 | A 1 | 40 | B 7 |
| 6 | A 2 | 25 | B 2 |
| 7 | A 2 | 15 | B 3 |
| 8 | A 2 | 25 | B 7 |
| 9 | A 3 | 30 | B 3 |
| 10 | A 3 | 30 | B 4 |
| 11 | A 3 | 30 | B 6 |
| 12 | A 4 | 30 | B 1 |
| 13 | A 4 | 25 | B 6 |
| 14 | A 4 | 30 | B 8 |
| 15 | A 5 | 10 | B 3 |
| 16 | A 5 | 15 | B 5 |
| 17 | A 5 | 10 | B 6 |
| 18 | A 6 | 20 | B 3 |
| 19 | A 6 | 20 | B 4 |
| 20 | A 6 | 20 | B 6 |
| 21 | A 7 | 30 | B 3 |
| 22 | A 7 | 30 | B 6 |
| 23 | A 7 | 20 | B 7 |
| 24 | A 8 | 10 | B 3 |
| 25 | A 8 | 20 | B 4 |
| 26 | A 8 | 20 | B 8 |
| 27 | A 1 | 25 | C 1 |
| 28 | A 1 | 20 | C 5 |
| 29 | A 2 | 30 | C 1 |
| 30 | A 2 | 20 | C 6 |
| 31 | A 2 | 20 | C 4 |
| 32 | A 3 | 25 | C 2 |
| 33 | A 3 | 15 | C 4 |
| 34 | A 3 | 20 | C 3 |
| 35 | A 4 | 25 | C 2 |
| 36 | A 4 | 15 | C 3 |
| 37 | A 4 | 20 | C 1 |

EVALUATION OF THE BINDERS ACCORDING TO EXAMPLES 1-37

Of the listed binders each 100 g resin solids samples were mixed with the pertinent acid and made up to 1000 g with deionized water while stirring. The 10 percent solution was deposited cathodically on steel. Deposition time in all cases was 60 seconds. The coated substrates were then rinsed with deionized water and cured at elevated temperature. The resulting films had a film thickness of 13 to 17 μm. The results are listed in Table 3.

TABLE 3

| | Neutralization | | | Deposition | | Test for | | | |
|---|---|---|---|---|---|---|---|---|---|
| | Quantity 1) | Type 2) | pH 3) | Volt | Cure Min/°C. | Hardness 4) | Indentation 5) | Resistance 6) | 7) |
| 1 | 4.2 | E | 6.2 | 190 | 20/180 | 200 | 6.8 | 480 | 400 |
| 2 | 4.0 | E | 6.3 | 220 | 15/170 | 190 | 6.6 | 400 | 340 |
| 3 | 5.5 | M | 6.0 | 290 | 20/180 | 160 | 7.5 | 360 | 320 |
| 4 | 1.8 | P | 5.3 | 230 | 20/180 | 210 | 6.0 | 360 | 300 |
| 5 | 5.6 | M | 5.9 | 170 | 20/180 | 160 | 8.0 | 320 | 240 |
| 6 | 4.4 | E | 6.0 | 180 | 20/180 | 180 | 7.8 | 380 | 320 |
| 7 | 4.0 | E | 6.2 | 200 | 15/180 | 190 | 7.5 | 400 | 360 |
| 8 | 5.5 | M | 6.0 | 190 | 20/180 | 170 | 8.4 | 360 | 280 |
| 9 | 4.5 | E | 5.9 | 180 | 15/180 | 180 | 7.8 | 460 | 360 |
| 10 | 4.5 | E | 5.8 | 180 | 20/180 | 200 | 7.5 | 380 | 320 |
| 11 | 1.8 | P | 5.4 | 210 | 25/180 | 210 | 7.0 | 420 | 320 |
| 12 | 5.8 | M | 5.6 | 190 | 20/180 | 190 | 6.8 | 400 | 320 |
| 13 | 2.0 | P | 5.3 | 200 | 25/180 | 200 | 6.6 | 460 | 360 |
| 14 | 5.8 | M | 5.6 | 180 | 20/180 | 180 | 7.3 | 360 | 240 |
| 15 | 4.5 | E | 6.0 | 230 | 20/180 | 170 | 8.0 | 380 | 240 |
| 16 | 4.6 | E | 5.9 | 260 | 20/180 | 160 | 8.5 | 420 | 240 |
| 17 | 2.0 | P | 5.3 | 290 | 25/180 | 190 | 7.8 | 360 | 240 |
| 18 | 6.0 | M | 5.5 | 230 | 20/180 | 170 | 7.5 | 380 | 260 |
| 19 | 6.0 | M | 5.5 | 200 | 20/180 | 190 | 7.0 | 380 | 240 |
| 20 | 2.0 | P | 5.3 | 270 | 25/180 | 180 | 6.9 | 400 | 280 |
| 21 | 5.5 | M | 6.0 | 200 | 15/180 | 170 | 8.5 | 360 | 240 |
| 22 | 2.8 | P | 5.5 | 210 | 25/180 | 180 | 7.0 | 360 | 260 |
| 23 | 5.6 | M | 6.1 | 190 | 20/180 | 160 | 8.8 | 260 | 200 |
| 24 | 4.3 | E | 6.2 | 190 | 20/180 | 170 | 7.8 | 360 | 240 |
| 25 | 4.5 | E | 5.9 | 170 | 25/180 | 180 | 7.0 | 300 | 220 |
| 26 | 4.5 | E | 5.9 | 170 | 25/180 | 160 | 8.0 | 280 | 200 |
| 27 | 4.2 | E | 6.2 | 190 | 20/170 | 200 | 6.8 | 480 | 400 |
| 28 | 4.0 | E | 6.3 | 220 | 20/150 | 190 | 6.6 | 400 | 360 |
| 29 | 5.5 | M | 6.0 | 290 | 30/150 | 180 | 7.5 | 360 | 320 |
| 30 | 3.8 | A | 6.0 | 230 | 20/170 | 190 | 7.0 | 360 | 300 |
| 31 | 3.6 | A | 6.1 | 210 | 20/160 | 180 | 7.6 | 420 | 360 |
| 32 | 4.4 | E | 6.0 | 180 | 20/170 | 180 | 7.8 | 380 | 320 |
| 33 | 4.0 | E | 6.2 | 200 | 20/160 | 190 | 7.5 | 400 | 360 |
| 34 | 5.5 | M | 6.0 | 190 | 30/150 | 170 | 8.4 | 360 | 280 |
| 35 | 4.5 | E | 5.8 | 180 | 20/170 | 180 | 6.8 | 460 | 360 |
| 36 | 4.5 | E | 5.8 | 180 | 20/170 | 200 | 7.5 | 480 | 360 |
| 37 | 3.8 | A | 6.0 | 210 | 20/170 | 210 | 7.0 | 420 | 320 |

Key to Table 3
1) quantity of acid in g added to 100 g of resin solids
2) E = acetic acid, M - lactic acid, P = phosphoric acid, A = formic acid
3) measured on a 10% solution
4) Konig pendulum hardness DIN 53 157 (sec)
5) Erichsen indentation DIN 53 156 (mm)
6) hours of water soak at 40° C. until corrosion or blistering become visible
7) salt spray resistance ASTM B 117 - 64 - 2 mm corrosion at cross incision after the listed number of hours.

For this test clean untreated steel panels were coated with a pigmented paint consisting in 100 parts by weight resin solids, 20 parts by weight of aluminum silicate pigment and 2 parts by weight of carbon black.

In the above illustrative examples various modifications can be made falling within the scope of the claimed invention. Such modifications being within the ability of one skilled in the art are within the scope of the present invention.

It is claimed:

1. Emulsions of binders which are cathodically depositable in an electrodeposition system comprising (A) 98 to 50 percent by weight of a water-soluble self-cross-linking cationic resin water-dilutable upon partial or total neutralization with an inorganic or organic acid, said resin containing on an average at least 0.5 basic nitrogen atoms in 1000 molecular weight units and a double bond number of at least 0.5; and (B) 2 to 50 percent by weight of a water-insoluble self-crosslinking polymeric resin having a double bond number of at least 0.8.

2. The emulsion of claim 1 wherein component (A) has on an average 0.8 to 1.5 basic nitrogen atoms in 1000 molecular weight units and a double bond number of from about 0.8 to 2.5.

3. The emulsion of claim 2 wherein the double bond number of component (B) is from about 1 to 4.

4. The emulsion of claim 3 wherein the polymeric resin is a polyaddition resin.

5. The emulsion of claim 1 wherein component (B) includes basic nitrogen atoms but insufficient to provide water-solubility upon neutralization with an inorganic and/or organic acid.

6. The emulsion of claim 5 wherein component (B) has a double bond number of at least 0.8 and a basic nitrogen atoms content on an average of from 0.3 to 1.7 in 1000 molecular weight units.

7. The process of providing a coating composition which will cathodically deposit when used in an electrodeposition process comprising the steps of (1) providing an emulsion of (A) 98 to 50 percent by weight of a water-soluble self-crosslinking cationic resin water-dilutable upon partial or total neutralization with inorganic or organic acids, said resin containing on an average a basic nitrogen content of at least 0.5 and a double bond number of at least 0.5, and (B) 2 to 50 percent by weight of a water-insoluble self-crosslinking polymeric resin having a double bond number of at least 0.8; and (2) neutralizing said reaction product with an inorganic or organic acid.

8. The emulsion of claim 1 wherein said polymeric resin is a polycondensation resin.

9. The process of claim 7 wherein said polymeric resin is a polycondensation resin.

* * * * * though noticed
REEXAMINATION CERTIFICATE (135th)
United States Patent [19]
Hönig et al.

[11] B1 4,174,332

[45] Certificate Issued Nov. 15, 1983

[54] SELF-CROSSLINKING RESIN EMULSIONS FOR CATHODICALLY DEPOSITABLE COATING COMPOSITIONS

[75] Inventors: Helmut Hönig; Georgios Pampouchidis, both of Graz, Austria

[73] Assignee: Vianova Kunstharz, A.G., Vienna, Austria

Reexamination Request:
No. 90/000,260, Sep. 29, 1982

Reexamination Certificate for:
Patent No.: 4,174,332
Issued: Nov. 13, 1979
Appl. No.: 874,565
Filed: Feb. 2, 1978

[30] Foreign Application Priority Data

Feb. 7, 1977 [AT] Austria .................................. 758/77
Dec. 15, 1977 [AT] Austria .................................. 8955/77

[51] Int. Cl.$^3$ .................................................. C08L 63/00
[52] U.S. Cl. ........................................ 523/404; 524/507; 524/539
[58] Field of Search ................................................... None

[56] References Cited
U.S. PATENT DOCUMENTS

| | | | |
|---|---|---|---|
| 2,840,542 | 6/1958 | Freeman et al. | 260/58 |
| 3,804,786 | 4/1974 | Sekmakas | 260/18 PT |
| 3,853,803 | 12/1974 | Anderson et al. | 524/809 |
| 3,869,366 | 3/1975 | Suzuki et al. | 204/181 |
| 3,928,156 | 12/1975 | Wismer et al. | 260/29.3 |
| 3,937,679 | 2/1976 | Bosso et al. | 260/29.3 |
| 3,975,251 | 8/1976 | McGinniss | 204/181 |
| 4,176,110 | 11/1979 | Otsuki et al. | 260/31.8 N |
| 4,207,222 | 6/1980 | Blum et al. | 260/29.3 |

OTHER PUBLICATIONS

Ternay, *Contemporary Organic Chemistry*, W. B. Saunders, Philadelphia, 1979, p. 894.
Kirk-Othmer, Ed., *Encyclopedia of Polymer Science & Technology*, John Wiley & Sons, 1968, vol. 9, p. 855.
Kirk-Othmer: Encyclopedia of Chemical Technology 8 pp. 831.

*Primary Examiner*—Maurice J. Welsh

[57] ABSTRACT

Aqueous emulsions of binders for cathodically depositable aqueous coating compositions comprising emulsions of (A) 98 to 50 percent by weight of at least one water-soluble self-crosslinking cationic resin which is water-dilutable upon partial or total neutralization with an inorganic or organic acid and having at least 0.5 basic nitrogen atoms in 1000 molecular weights units and a double bond number of at least 0.5; and (B) 2 to 50 percent by weight of water-insoluble self-crosslinking polycondensation resin or polymerization resin having a double bond number of at least 0.8. Optionally, the water-insoluble self-crosslinking resin can include basic character but insufficient to provide water solubility. The emulsions have excellent stability without use of other emulsifiers even in substantially diluted form usual for electrodeposition baths. The emulsions when used in coating compositions provide films which have good adhesion characteristics, cure at relatively low temperatures and relatively short curing times to provide films having excellent resistance to water, chemicals, and corrosion.

REEXAMINATION CERTIFICATE ISSUED UNDER 35 U.S.C. 307.

SELF-CROSSLINKING RESIN EMULSIONS FOR CATHODICALLY DEPOSITABLE COATING COMPOSITIONS

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7 are determined to be patentable as amended:

Claims 2-6, 8, and 9, dependent on amended claims, are determined to be patentable.

New claims 10-19 are added and determined to be patentable.

1. Emulsions of binders which are cathodically depositable in an electrodeposition system comprising (A) 98 to 50 percent by weight of a water-soluble self-crosslinking cationic resin water-dilutable upon partial or total neutralization with an inorganic or organic acid, said resin containing on an average at least 0.5 basic nitrogen atoms in 1000 molecular weight units and a double bond number of at least 0.5; and (B) 2 to 50 percent by weight of a water-insoluble self-crosslinking polymeric resin having a double bond number of at least 0.8, *said double bond number being the number of chain end and side chain double bonds in 1000 molecular weight units.*

7. The process of providing a coating composition which will cathodically deposit when used in an electrodeposition process comprising the steps of (1) providing an emulsion of (A) 98 to 50 percent by weight of a water-soluble self-crosslinking cationic resin water-dilutable upon partial or total neutralization with inorganic or organic acids, said resin containing on an average a basic nitrogen content of at least 0.5 and a double bond number of at least 0.5 and (B) 2 to 50 percent by weight of a water-insoluble self-crosslinking polymeric resin having a double bond number of at least 0.8; and (2) neutralizing said *emulsion* [reaction product] with an inorganic or organic acid, *said double bond number being the number of chain end and side chain double bonds in 1000 molecular weight units.*

*10. The emulsions of claim 1 wherein the double bond number in component (A) is derived, at least in part, from (meth)acrylic acid or an ester of (meth)acrylic acid.*

*11. The emulsions of claim 10 wherein the double bond number of component (B) is derived, at least in part, from (meth)acrylic acid or an ester of (meth)acrylic acid.*

*12. The process of claim 7 wherein the double bond number in component (A) is derived, at least in part, from (meth)acrylic acid or an ester of (meth)acrylic acid.*

*13. The process of claim 12 wherein the double bond number of component (B) is derived, at least in part, from (meth)acrylic acid or an ester of (meth)acrylic acid.*

*14. The emulsions of claim 11 wherein the basic nitrogen atoms are tertiary amine groups.*

*15. The process of claim 13 wherein the basic nitrogen atoms are tertiary amine groups.*

*16. The emulsions of claim 14 wherein the basic nitrogen atoms are derived from a monoisocyanate.*

*17. The emulsions of claim 14 wherein the basic nitrogen atoms are derived from diethylamine.*

*18. The process of claim 15 wherein the tertiary nitrogen atoms are derived from a monoisocyanate.*

*19. The process of claim 15 wherein the basic nitrogen atoms are derived from diethylamine.*

* * * * *